United States Patent
Choi et al.

(10) Patent No.: US 9,756,640 B2
(45) Date of Patent: *Sep. 5, 2017

(54) CELL DEPLOYMENT WITH DIFFERENT CHANNEL BANDWIDTH FOR CARRIER AGGREGATION

(71) Applicant: Marvell World Trade Ltd., St. Michael (BB)

(72) Inventors: Jihwan P. Choi, Daegu (KR); Qing Zhao, Milpitas, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,484

(22) Filed: Aug. 14, 2015

(65) Prior Publication Data

US 2015/0358956 A1    Dec. 10, 2015

Related U.S. Application Data

(63) Continuation of application No. 13/854,224, filed on Apr. 1, 2013, now Pat. No. 9,113,469.

(Continued)

(51) Int. Cl.
*H04W 72/04* (2009.01)
*H04W 48/20* (2009.01)
*H04W 88/10* (2009.01)

(52) U.S. Cl.
CPC ....... *H04W 72/0453* (2013.01); *H04W 48/20* (2013.01); *H04W 72/042* (2013.01); *H04W 72/048* (2013.01); *H04W 88/10* (2013.01)

(58) Field of Classification Search
CPC ... H04W 72/042; H04W 88/10; H04W 72/04; H04W 72/0453
See application file for complete search history.

(56) References Cited

U.S. PATENT DOCUMENTS

2010/0040004 A1* 2/2010 Damnjanovic ....... H04L 5/0007
                                                        370/329
2011/0026495 A1* 2/2011 Lee .......................... H04L 5/001
                                                        370/335

(Continued)

OTHER PUBLICATIONS

3GPP TS 36.211 V10.4.0 (Dec. 2011), Technical Specification, 3rd Generation Partnership Project; Technical Specification Group Radio Access Network.

(Continued)

*Primary Examiner* — Lakeram Jangbahadur
(74) *Attorney, Agent, or Firm* — Ropes & Gray LLP (57) ABSTRACT

Systems, methods, apparatus, and techniques are provided for transmitting information to user equipment (UE) in a communications network. Data is generated in (i) a first frequency range associated with a first set of carriers and (ii) a second frequency range associated with a second set of carriers, where the first frequency range specifies a first communications cell and the second frequency range specifies a second communications cell. The first cell, is assigned as a primary cell to a first set of UEs in the communications network. Control data is transmitted to both the first set of UEs and a second set of UEs using at least a portion of the first set of carriers.

18 Claims, 5 Drawing Sheets

Related U.S. Application Data (60) Provisional application No. 61/618,949, filed on Apr. 2, 2012.

(56) References Cited

U.S. PATENT DOCUMENTS

| | | |
|---|---|---|
| 2011/0081913 A1 | 4/2011 | Lee et al. |
| 2011/0085457 A1* | 4/2011 | Chen .................... H04L 1/1812 |
| | | 370/252 |
| 2011/0103243 A1 | 5/2011 | Larsson et al. |
| 2011/0170496 A1 | 7/2011 | Fong et al. |
| 2011/0261704 A1 | 10/2011 | Etemad |
| 2012/0207047 A1 | 8/2012 | Liao et al. |
| 2013/0028117 A1 | 1/2013 | Montojo et al. |

OTHER PUBLICATIONS

3GPP TS 36.300 V10.6.0 (Dec. 2011), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) (2011).

International Search Report dated Aug. 1, 2013 for Application No. PCT/US2013/034763.

\* cited by examiner

CELL DEPLOYMENT WITH DIFFERENT CHANNEL BANDWIDTH FOR CARRIER AGGREGATION

CROSS-REFERENCE TO RELATED APPLICATIONS

This patent document is a continuation of copending, commonly-assigned U.S. patent application Ser. No. 13/854,224, filed Apr. 1, 2013 (now U.S. Pat. No. 9,113,469), which claims the benefit of, and priority to, U.S. Provisional Application No. 61/618,949, filed Apr. 2, 2012, each of which is incorporated herein by reference in its respective entirety.

FIELD OF USE

This disclosure relates to techniques for performing carrier aggregation in wireless communications systems, including 3rd generation partnership project (3GPP) long-term evolution (LTE) and worldwide interoperability for microwave access (WiMAX) communications systems.

BACKGROUND OF THE DISCLOSURE

Carrier aggregation (CA) is a technique used in multicarrier wireless communications networks, including 3GPP LTE and WiMAX networks, in which bandwidth associated with multiple carriers (e.g., between two and five carriers) is aggregated and assigned to a single user equipment (UE) (or other wireless device). Allocating bandwidth to a UE in this manner is advantageous for increasing a communications throughput of the UE and the wireless communications network as a whole. However multiple classes of UEs exist in many communications networks. For example, a communications network may include a class of UEs that are CA-capable and another class of UEs that are not CA-capable (this latter class may correspond to legacy UEs).

SUMMARY OF THE DISCLOSURE

Systems, methods, apparatus, and techniques are provided for transmitting information to UE in a communications network. Data is generated in (i) a first frequency range associated with a first set of carriers and (ii) a second frequency range associated with a second set of carriers, where the first frequency range specifies a first communications cell and the second frequency range specifies a second communications cell. The first cell is assigned as a primary cell to a first set of UEs in the communications network. Control data is transmitted to both the first set of UEs and a second set of UEs using at least a portion of the first set of carriers.

In some arrangements, the second set of UEs are CA-capable, and the first set of UEs are not CA-capable. In some arrangements, the first cell is assigned as a secondary cell to a second set of UEs in the communications network. In some arrangements, a first amount of bandwidth in the first cell is assigned to the first set of UEs and a second amount of bandwidth in the first cell to the second set of UEs, where the first amount of bandwidth is different than the second amount of bandwidth. In some arrangements, control data is transmitted in the first frequency range during a control time period.

In some arrangements, the control data comprises control signals shared by the first set of UEs and the second set of UEs, and transmitting the control data comprises transmitting the control data in a first subregion of the first frequency range. In some arrangements, the control data comprises control signals for the second set of UEs, and transmitting the control data comprises transmitting the control signals in a second subregion and a third subregion of the first frequency range.

In some arrangements, at least one CA-capable UE and at least one UE that is not CA-capable are both located in the first cell. In some arrangements, transmitting the control data comprises transmitting control data to both the first set of UEs and the second set of UEs using different time and frequency resources to at least partially avoid interference between control data intended for the first set of UEs and the second set of UEs. In some arrangements, a bandwidth amount for the second set of UEs is transmitted over a data channel located in a primary cell of the second set of UEs.

BRIEF DESCRIPTION OF THE FIGURES

The above and other aspects and potential advantages of various arrangements will be apparent upon consideration of the following detailed description, taken in conjunction with the accompanying drawings, in which like reference characters refer to like parts throughout, and in which.

DETAILED DESCRIPTION OF THE DISCLOSURE

Accordingly, disclosed herein are techniques that enable the coexistence of both a modern UE and a legacy UE on a single communications network, where the modern UP is CA-capable (also referred to as CA-enabled) and the legacy UE is not CA-capable. The techniques disclosed herein are applicable to, e.g., release-10 (R10) LTE base stations, which provide service to both R10 UE, which is CA capable, and legacy release-8 (R8) and release-9 (R9) legacy UE, which is not CA-capable. As will be understood by one of ordinary skill in the art, based on the disclosure and teachings herein, the terms "modern" and "legacy" represent only one manner in which the techniques disclosed herein may be applied to two classes of UE. In general, the techniques disclosed herein may be applied to a wireless network that includes two or more classes of UE, where some of the classes of UE operate in a CA-capable mode, while other classes of UE operate without CA (i.e., using bandwidth associated with only a single career).

Figure 1:
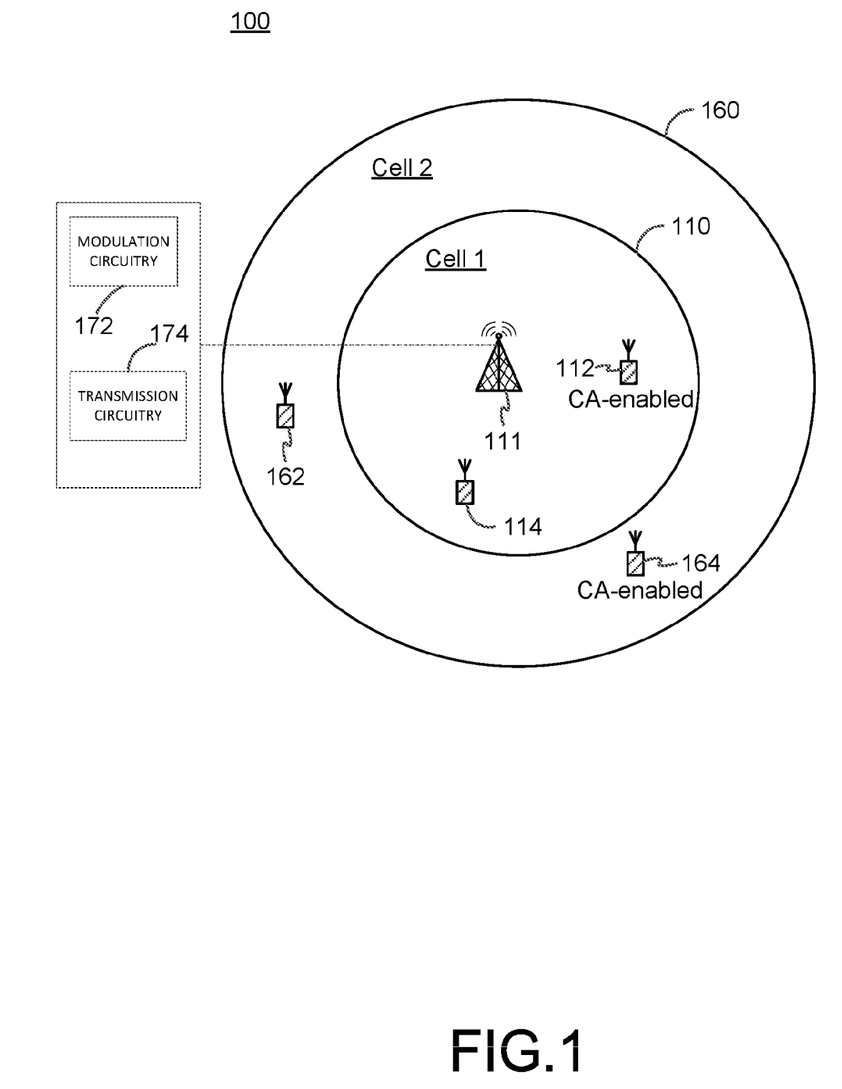
FIG. 1 depicts an illustrative multi-cell communications network supporting a set of UEs that are CA-capable and a set of UEs that are not CA-capable in accordance with some arrangements.

FIG. 1 depicts an illustrative multi-cell communications network supporting a set of UEs that are CA-capable and a set of UEs that are not CA-capable in accordance with some arrangements. In particular, base station 111 sends and receives data from each of UEs 112 and 164, which are CA-capable, and UEs 114 and 162, which are not CA-capable. In some embodiments, base station 111 includes modulation circuitry 172 and transmission circuitry 174.

Figure 2:
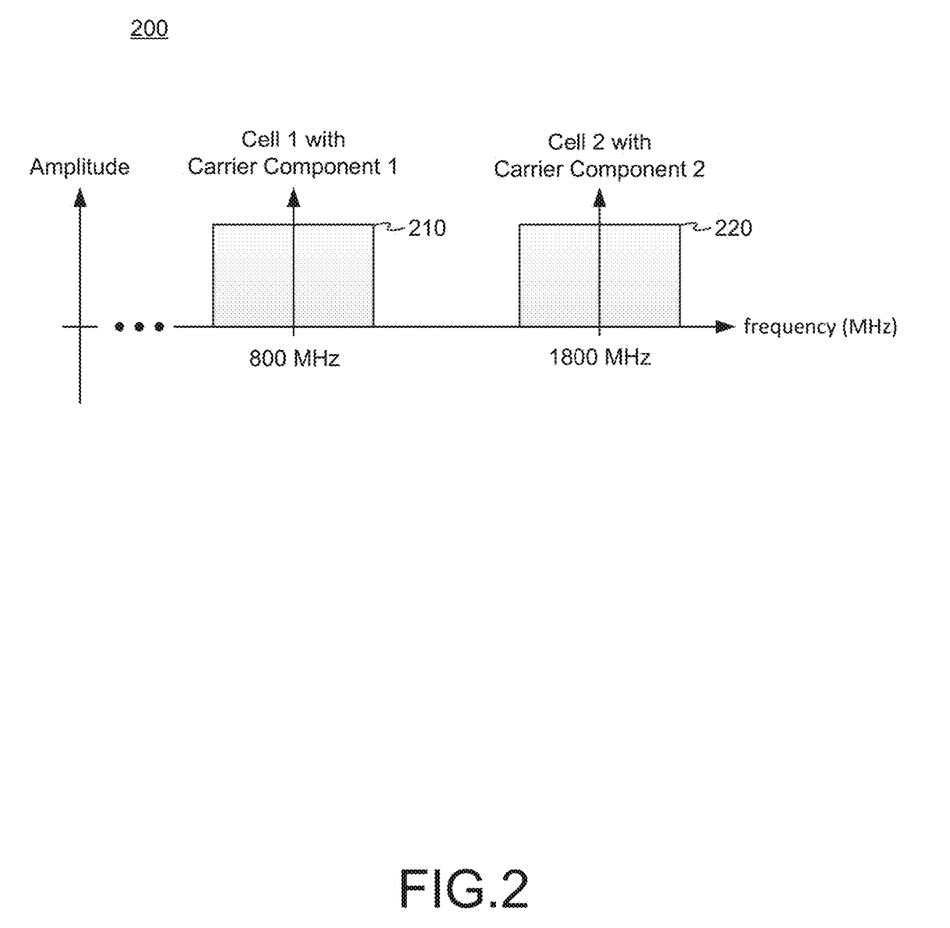
FIG. 2 depicts two illustrative bandwidth regions over which a base station may communicate with UEs in accordance with some arrangements.

The UEs 112 and 164 communicate with the base station 111 using bandwidth associated with two or more carriers and this bandwidth may or may not occupy a contiguous region of spectrum in the frequency domain. For example, with reference to FIG. 2, in an implementation, the UE 164 communicates with the base station 111 using bandwidth region 210, centered at 800 MHz, and bandwidth region 220, centered at 1800 MHz. Each of these regions may be large enough to allow a maximum communications rate of 150 Mbps, in which case the UE 164 communicates with the base station 111 at an aggregate maximum rate of 300 Mbps. The UEs 114 and 162 (of FIG. 1), which are not CA capable, communicate with the base station 111 using bandwidth associated with a single carrier. For example, in an implementation, the UEs 114 and 162 communicate with the base station 111 using only the bandwidth region 210 centered at 800 MHz (FIG. 2). The UEs 112 and 164, which are CA-capable, are capable of communications with the base station 111 using both of the bandwidth regions 210 and 220. However, the physical location of the UE 164 in cell 2 160 may mean that the frequencies associated with the high-frequency bandwidth region 220 are sufficiently attenuated so that the UE 164 communicates with the base station 111 using only the bandwidth region 210 centered at 300 MHz.

In general, the communications network depicted in FIG. 1 supports a total of N bandwidth regions, were N is an integer value greater than or equal to the value two. Each bandwidth region defines a communications cell, i.e., a region of physical space over which data transmissions from the base station 111 are reliably received and processed by a UE operating over that bandwidth region. Different bandwidth regions will have different associated cells for a variety of reasons. For example, higher bandwidth regions are associated with more rapid signal attenuation than lower bandwidth regions, and so higher bandwidth regions tend to have smaller associated cells than lower bandwidth regions. Further, a base station may use different transmission power for communications occurring in different cells and this may be a factor affecting a size of a cell associated with a given bandwidth region.

For example, in FIG. 1, cell 1 110 denotes a physical region over which data transmissions from the base station 111 are reliably received when the base station 111 transmits using the bandwidth region 220 (FIG. 2) centered at 1800 MHz, and cell 2 160 denotes the physical region over which data transmissions from the base station 111 are reliably received when the base station 111 transmits using the bandwidth region 210 (FIG. 2) centered at 800 MHz.

Assuming that the bandwidth regions 210 and 220 are associated with the cells 160 and 110, respectively, the UEs 112, 114, 162, and 164 may each operate according whether they are CA-capable and whether they are located in the cell 160 or the cell 110. For example, in an implementation, the UE 112, which is CA-capable, receives communications from the base station 111 on both the bandwidth regions 210 and 220. In contrast, the UE 164, which is also CA-capable, receives communications from the base station 111 only the bandwidth region 210 associated with the cell 2 160. This is because the UE 164 is outside the communications range of the cell 1 110 and so cannot reliably receive communications over the bandwidth region 210 associated with the cell 1 110.

Continuing the example, the UE 114, which is not CA-capable, receives communications from the base station 111 on exactly one (but not both) of the bandwidth regions 210 and 220. The UE 162, which is not CA-capable, receives communications only on the bandwidth region 210 since the UE 162 is outside the cell 1 110.

Figure 3:
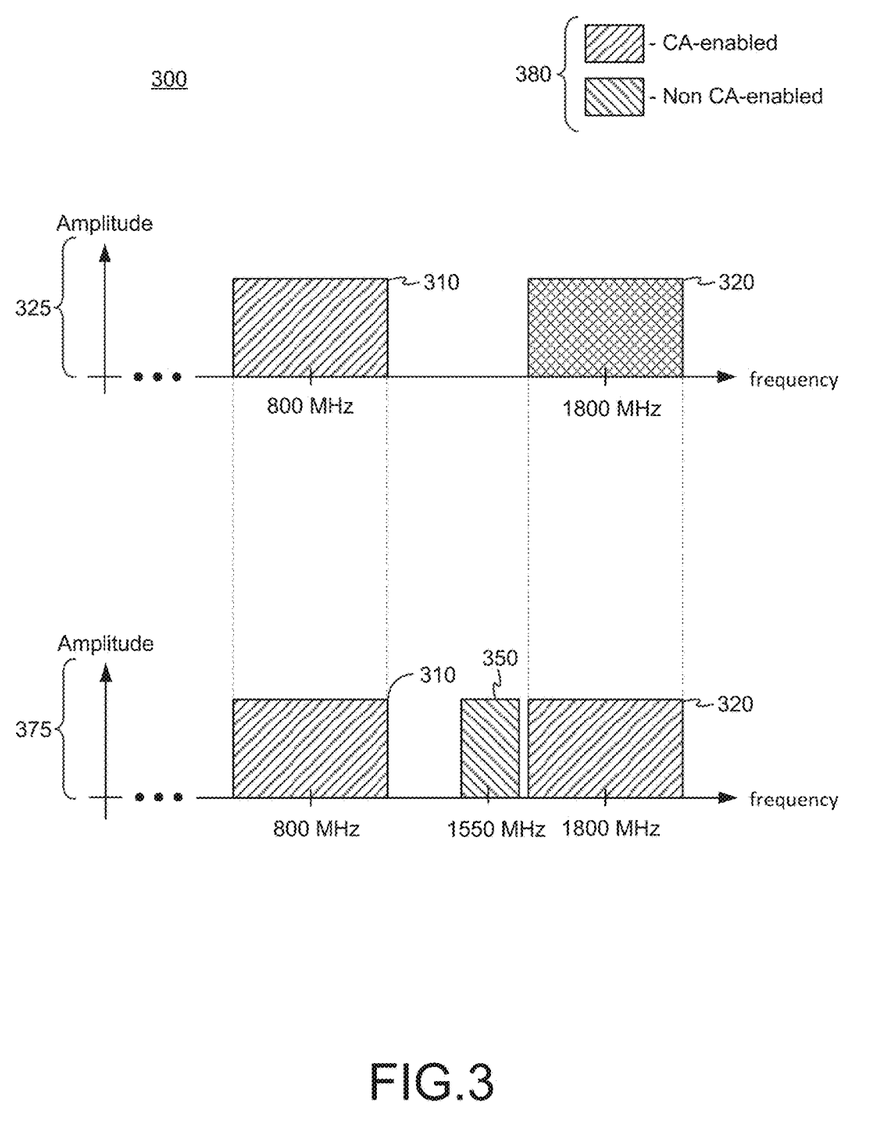
FIG. 3 depicts two illustrative strategies for allocating bandwidth in a communications system which includes a set UEs that are CA-capable and a set of UEs that are not CA-capable in accordance with some arrangements.

FIG. 3 depicts two illustrative strategies for allocating bandwidth in a communications system which includes a set UEs that are CA-capable and a set of UEs that are not CA-capable in accordance with some arrangements. Specifically, each of allocation 325 and allocation 375 show the bandwidth regions over which the base station 111 communicates with a first set of one or more CA-capable UEs and a second set of one or more UEs that are not CA-capable using the hatch-mark styles denoted in legend 380. According to the allocation 325, the base station communicates with the CA-capable UEs over two bandwidth regions 310 and 320 centered at 800 MHz and 1800 MHz, respectively. Further, the base station communicates with the set of UEs that are not CA-capable over the bandwidth region 320 (i.e., which is also part of the bandwidth used by the CA-capable UEs).

As depicted in FIG. 3 with respect to the allocation 325, both the UEs that are CA-capable and not CA-capable use the same bandwidth on a per-carrier basis. A potential disadvantage of allocating the same bandwidth to both types of UEs is that is may not distribute network resources evenly. For example, the UEs that are CA-capable may operate with hardware of different capabilities, with different application throughput, or different quality-of-service requirements and so it may be advantageous to allocate a different bandwidth to the UEs that are CA-capable as opposed to those UEs that are not CA capable.

In an alternative approach, and according to the allocation 375, the base station still communicates with CA-capable UEs over two bandwidth regions 310 and 320 centered at 800 MHz and 1800 MHz, respectively. However, according to this strategy, the base station communicates with the set of UEs that are not CA-capable over a dedicated bandwidth region 350 (that is centered at 1550 MHz) and does not overlap with bandwidth regions assigned to the set of UEs that are CA-capable. While this approach allows for the different types of UEs present in a communications network to have a UE-type specific bandwidth allocation, the approach may suffer from certain disadvantages.

First, because there is no overlap in the bandwidth used by CA-capable and non CA-capable UEs in the allocation 375, control data and synchronization signals are be transmitted to each type of UE on a respective frequency. For example, in a 3GPP LTE system, master information block (MIB) and system information block (SIB) information is transmitted to each type of UE on a corresponding (different) frequency. Not only does this approach potentially use bandwidth inefficiently, but it also means that CA-capable UEs are unlikely to be backwards-compatible with non CA-capable UEs (in the case that CA-capable UEs correspond to more recently developed devices and non CA-capable devices correspond to legacy devices).

Second, because the bandwidth dedicated to non CA-capable UEs sits in a dedicated bandwidth region (e.g., the bandwidth region 350 in FIG. 3), the bandwidth dedicated to non CA-capable UEs is susceptible to co-channel interference from third-party communications (those not belonging to the communications network of which the UEs are a member) that may operate in the portions of bandwidth not assigned to the communications network. For example, with reference to FIG. 3, if a third-party communications system is assigned to the whitespace between bandwidth regions 310 and 350, then the non CA-capable UEs operating in the bandwidth region 350 may experience co-channel interference from the third-party system (in contrast, such co-channel interference can be controlled and minimized between UEs belonging to the same system and operating in adjacent bands since protocol and hardware design is under common control).

Figure 4:
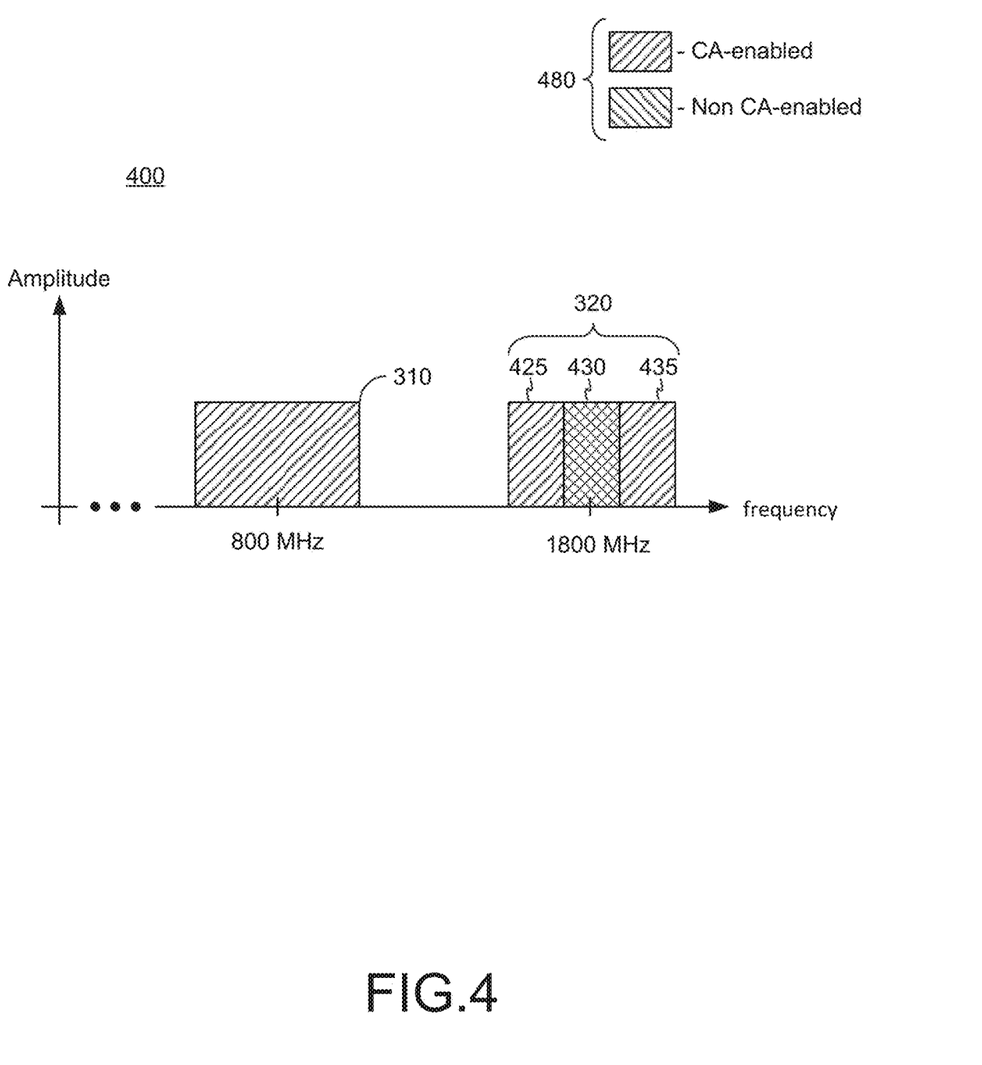
FIG. 4 depicts another illustrative strategy for allocating bandwidth in a system having a set UEs that are CA-capable and a set of UEs that are not CA-capable in accordance with some arrangements.

FIG. 4 depicts another illustrative strategy for allocating bandwidth in a system having a set UEs that are CA-capable and a set of UEs that are not CA-capable in accordance with some arrangements. According to this strategy, the base station 111 again communicates with CA-capable UEs over the two bandwidth regions 310 and 320 centered at 800 MHz and 1800 MHz, respectively. However, according to this strategy, the base station communicates with the set of UEs that are not CA-capable over a bandwidth region 430 (also centered at 1800 MHz) that is centered within an interior portion of the bandwidth region 320.

The arrangement of the bandwidth region 430 in the interior of the bandwidth region 320 has certain advantages over arrangements described in relations to FIGS. 2 and 3. First, control data and synchronization signals may be transmitted to both types of UEs on a common frequency located within, or equal to, the bandwidth region 430. For example, in a 3GPP LTE system, MIB and SIB information may be transmitted to both types of UEs over the bandwidth region 430. This advantageously enables CA-capable UEs to be backwards compatible with non CA-capable UEs.

Second, since frequencies adjacent to the bandwidth region 430 are used by the same communications network of which the UEs that use the bandwidth region 430 are a member, co-channel interference can be controlled and minimized between UEs belonging to the same system and operating in adjacent bands since as protocol and hardware design is under common control. For example, one or more parameters of data channels, control channels, or reference signals may be chosen so that the set of non CA-capable UEs using the bandwidth region 430 and the set of CA-capable UEs using the bandwidth region 320 have a minimal or no interference, e.g., in the form of scheduling conflicts or other types of interference.

Consider a CA-capable UE that communicates with a base station using two cells (e.g., the UE 112 of FIG. 1). In some implementations, the CA-capable UE receives control information for both cells in the bandwidth associated with one cell with the one cell referred to as a "primary cell" (and the other cell referred to as a "secondary cell"). For example, consider a CA-capable UE communicating with a base station using a primary cell and a secondary cell corresponding to the bandwidth regions 310 and 320, respectively, in FIG. 4. In some implementations, control information (e.g., MIB and SIB information) for the CA-capable UE, for both the primary cell and the secondary cell, is transmitted in the bandwidth region 310 associated with the primary cell. Thus, the CA-capable UE is not required to decode control information in the secondary cell itself.

With continued reference to FIG. 4, in some implementations, a non CA-capable LIE uses the bandwidth region 430 as its primary (and sole) cell. Thus, in some implementations, CA-capable UEs use the bandwidth region 310 as a primary cell and the bandwidth region 320 as a secondary cell, while non CA-capable UEs use the bandwidth region 430 as a primary cell. Further, a non CA-capable UE may receive and decode control information in the same way as the non CA-capable UE would in a legacy system (e.g., for example, according to a R8 or R9 protocol in a 3GPP LTE system). In some implementations, the communications network in which the two types of UEs operate (i.e., CA-capable and non CA-capable UEs) can configure respective channel bandwidths based on their respective MIB data.

Figure 5:
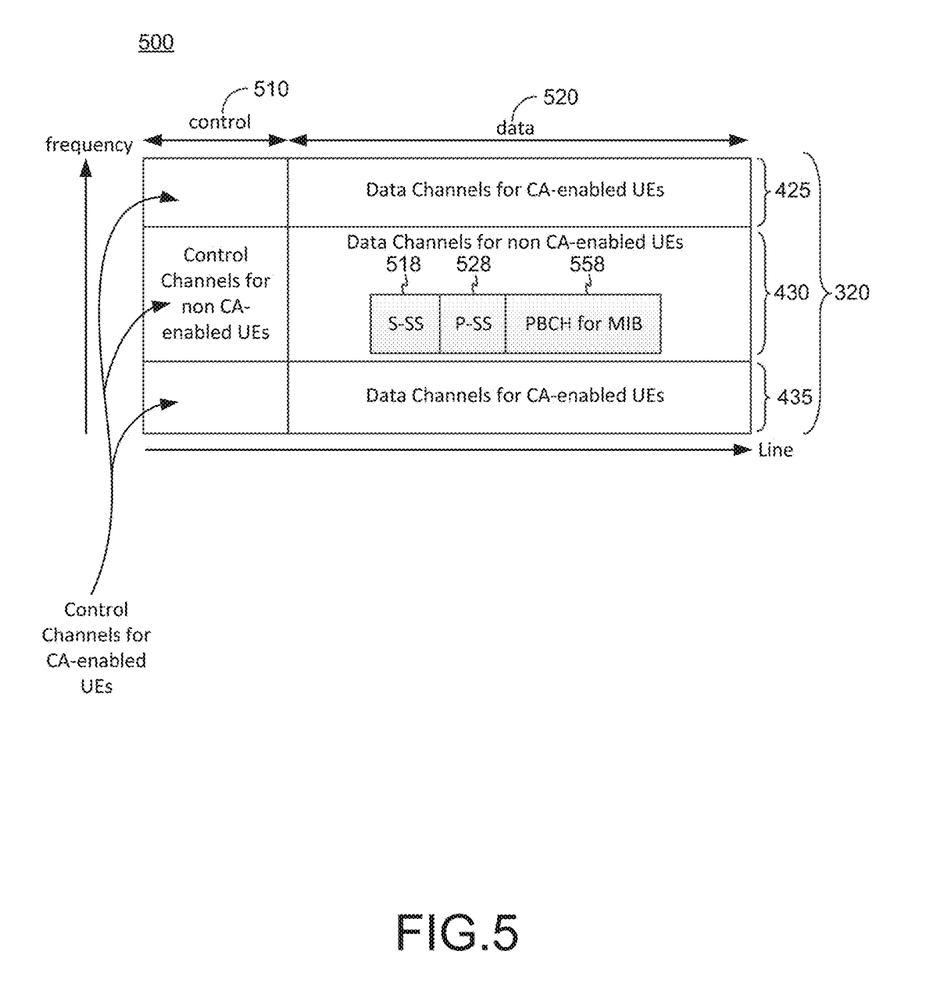
FIG. 5 depicts control channel and data channel allotments across a mixed-use bandwidth region over a period of time in accordance with some arrangements.

FIG. 5 depicts control channel and data channel allotments across a mixed-use bandwidth region over a period of time in accordance with some arrangements. In particular, diagram 500 depicts a manner in which control channel, and data channels are allotted to CA-capable UEs and non CA-capable UEs within the bandwidth region 320 (also see FIGS. 3 and 4), which includes the bandwidth regions 425, 430, and 435 (also see FIG. 4).

As depicted in FIG. 5, during a control time period 510, the base station 111 communicates control information to CA capable UEs and non CA-capable UEs using the bandwidth region 430. The base station 111 communicates control information to CA-capable UEs (but not non CA-capable UEs) using the bandwidth regions 425 and 435 in addition to the bandwidth region 430. In some implementations, the control information is distributed approximately evenly over carriers within each of bandwidth regions 425, 430, and 435. In some implementations, control information is coded using a low-order modulation (e.g., Binary Phase Shift Keying (PSK) or Quadrature PSK (QPSK)). The techniques of evenly distributing control information and using a low-order modulation provide frequency diversity and relatively high signal-to-noise ratio values, respectively, and generally increase a reliability of decoding.

During a data time period 520, the base station 111 communicates data information to CA-capable UEs using the bandwidth regions 425 and 435 and to non CA-capable UEs using the bandwidth region 430. Among data transmitted during the data time period 520 is a secondary synchronization signal 518 (S-SS), a primary synchronization signal (P-SS) 528, and physical broadcast channel (PBCH) information for a master information block (MIB) 558. In some implementations, the master information block, includes a downlink system bandwidth, a physical hybrid ARQ indicator channel structure, and at least a portion of a system frame number (e.g., the most significant eight bits of the system frame number).

As referred to above, in some implementations, a communications (e.g., cellular) network supports CA-capable UEs by deploying two cells, each associated with a different range of carrier frequencies. In general, both CA-capable UEs and non CA-capable UEs will be present in each cell. In some implementations, both CA-capable UEs and non-CA capable UEs share certain reference and synchronization signals (transmitted, e.g., in the bandwidth region 430 for reception by both types of UEs). For example, a cell-specific reference signal (CRS), P-SS, and S-SS may all be transmitted in the bandwidth region 430 and shared by CA-capable UEs and non-CA capable UEs. In some implementations, non CA-capable UEs receive PBCH information, but CA-capable UEs do not.

Further, in some implementations, CA-capable UEs and non CA-capable UEs each receive dedicated information for physical downlink control channel (PDCCH), physical HARQ indicator channel (PHICH), and physical control format indicator channel (PCFICH). In some implementations, parameters of control channels and reference signal that depend on a channel bandwidth are selected to minimize or avoid interface between the two types of UEs (i.e., CA-capable and non CA-capable UEs). In some implementations, some or all of the following parameters depend on a cell bandwidth: various resource elements of the physical control format indicator channel (PCFICH), physical hybrid-ARQ indicator channel (PHICH), and physical downlink control channel (PDCCH), and scrambling sequences for the cell-specific reference signal (CRS), and P-SS and S-SS signals.

To avoid interference between CA-capable UEs and non CA-capable UEs with respect to the PCFICH, PHICH, CRS, P-SS, and S-SS, different cell IDs with an appropriate offset may be used. To avoid interface between CA-capable UEs and non CA-capable UEs with respect to the PDCCH, different time and frequency components may be used to orthogonalize transmissions. Further, small sized signal constellations and low-rate channel coding may be used to further prevent interference between CA capable UEs and non CA-capable UEs.

While various embodiments of the present disclosure have been shown and described herein, such embodiments are provided by way of example only. Numerous variations, changes, and substitutions are possible without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for receiving information using a plurality of user equipment (a plurality of UEs) in a communications network, comprising:
    processor configured to process control signals; and
    transmission circuitry configured to transmit:
        a first set of carriers associated with a first frequency range, wherein the first frequency range comprises a first bandwidth subregion, a second bandwidth subregion, and a third bandwidth subregion and wherein the first frequency range specifies a first UE's primary cell and a second UE's secondary cell; and
        a second set of carriers associated with a second frequency range, wherein the second frequency range specifies the second UE's primary cell; and
    wherein:
        control signals for the first UE are received in the first bandwidth subregion of the first frequency range, are not received in the second bandwidth subregion of the first frequency range, and are not received in the third bandwidth subregion of the first frequency range,
        control signals for the second UE are received in both the second and the third bandwidth subregions of the first frequency range, and
        the first UE and the second UE are configured to receive the control signals using different time and frequency resources to at least partially avoid interference between the control signals for the first UE and the control signals for the second UE.

2. The system of claim 1, wherein the second UE is carrier aggregation (CA)-capable and the first UE is not CA-capable.

3. The system of claim 1, wherein the control signals for the first UE and the control signals for the second UE are both received in the first frequency range during a control time period.

4. The system of claim 1, wherein the transmission circuitry is further configured to transmit to the second UE a bandwidth amount over a data channel located within the primary cell of the second UE.

5. The system of claim 1, wherein the control signals for the first UE and the control signals for the second UE are received from a base station, the base station comprising modulation circuitry and additional transmission circuitry.

6. The system of claim 1, wherein the control signals for the first UE are distributed approximately evenly over the first set of carriers within each of the first bandwidth subregion, the second bandwidth subregion, and the third bandwidth subregion of the first frequency range.

7. The system of claim 1, wherein the control signals for the second UE are received in the first frequency range in addition to the second frequency range.

8. The system of claim 1, wherein
    data signals for the first UE are received in the first bandwidth subregion of the first frequency range, are not received in the second bandwidth subregion of the first frequency range, and are not received in the third bandwidth subregion of the first frequency range, and
    wherein data signals for the second UE are received in both the second and the third bandwidth subregions of the first frequency range and are not received in the first bandwidth subregion of the first frequency range.

9. A system for transmitting information to a plurality of user equipment (a plurality of UEs) in a communications network, the system comprising:
    modulation circuitry configured to generate data in a first frequency range associated with a first set of carriers and a second frequency range associated with a second set of carriers, wherein the first frequency range comprises a first bandwidth subregion, a second bandwidth subregion, and a third bandwidth subregion, wherein the first frequency range specifies a first UE's primary cell and a second UE's secondary cell in the communications network, and wherein the second frequency range specifies the second UE's primary cell in the communications network; and
    transmission circuitry configured to:
        transmit control signals to the first UE in the first bandwidth subregion of the first frequency range, and not in the second bandwidth subregion of the first frequency range and not in the third bandwidth subregion of the first frequency range,
        transmit control signals for the second UE in both the and the third bandwidth subregions of the first frequency range, and
        wherein the controls signals for the first UE and second UE are transmitted using different time and frequency resources to at least partially avoid interference between the control signals for the first UE and the control signals for the second UE.

10. A method for receiving information with a plurality of user equipment (a plurality of UEs) in a communications network, the method comprising:
    using, by a first UE in the communications network, a first frequency range as a primary cell, wherein the first frequency range is associated with a first set of carriers, and wherein the first frequency range comprises a first bandwidth subregion, a second bandwidth subregion, and a third bandwidth subregion;
    using, by a second UE in the communications network, a second frequency range as a primary cell and the first frequency range as a secondary cell, wherein the second frequency range is associated with a second set of carriers;
    receiving control signals for the first UE in the first bandwidth subregion of the first frequency range, and not in the second bandwidth subregion of the first frequency range and not in the third bandwidth subregion of the first frequency range;

receiving control signals for the second UE in both the second and the third bandwidth subregions of the first frequency range, wherein the control signals are received using different time and frequency resources to at least partially avoid interference between the control signals for the first UE and the control signals for the second UE.

11. The method of claim 10, wherein the second UE is carrier aggregation (CA)-capable and wherein the first UE is not CA-capable.

12. The method of claim 10, further comprising receiving both the control signals for the first UE and the control signals for the second UE in the first frequency range during a control time period.

13. The method of claim 10, further comprising receiving, with the second UE, a bandwidth amount over a data channel located within the primary cell of the second UE.

14. The method of claim 10, further comprising receiving, with the first UE and the second UE, the control signals from a base station, wherein the base station comprises modulation circuitry and additional transmission circuitry.

15. The method of claim 10, wherein the control signals for the first UE are distributed approximately evenly over the first set of carriers within each of the first bandwidth subregion, the second bandwidth subregion, and the third bandwidth subregion of the first frequency range.

16. The method of claim 10, wherein the control signals for the second UE are received in the first frequency range in addition to the second frequency range.

17. The method of claim 10, further comprising:
receiving data signals for the first UE in the first bandwidth subregion of the first frequency range, and not in the second bandwidth subregion of the first frequency range, and not in the third bandwidth subregion of the first frequency range; and
receiving data signals for the second UE in both the second and the third bandwidth subregions of the first frequency range, and not in the first bandwidth subregion of the first frequency range.

18. A method for transmitting information to a plurality of user equipment (plurality of UEs) in a communications network, the method comprising:
generating data in a first frequency range associated with a first set of carriers and a second frequency range associated with a second set of carriers, wherein the first frequency range comprises a first bandwidth subregion, a second bandwidth subregion, and a third bandwidth subregion, wherein the first frequency range specifies a first UE's primary cell and a second UE's secondary cell in the communications network, and wherein the second frequency range specifies the second UE's primary cell in the communications network;
transmitting control signals to the first UE in the first bandwidth subregion of the first frequency range, and not in the second bandwidth subregion of the first frequency range and not in the third bandwidth subregion of the first frequency range; and
transmitting control signals to the second UE in both the second and the third bandwidth subregions of the first frequency, and
wherein the controls signals for the first UE and second UE are transmitted using different time and frequency resources to at least partially avoid interference between the control signals for the first UE and the control signals for the second UE.

* * * * *